E. A. HOLDEN.
TICKET HOLDER.
APPLICATION FILED MAY 6, 1911.

1,025,805.

Patented May 7, 1912.

Witnesses
William R. Smith.
P. A. Foster

Inventor
Eugene A. Holden.

By Victor J. Evans
Attorney

UNITED STATES PATENT OFFICE.

EUGENE A. HOLDEN, OF ATHOL, MASSACHUSETTS.

TICKET-HOLDER.

1,025,805.  Specification of Letters Patent.  Patented May 7, 1912.

Application filed May 6, 1911. Serial No. 625,620.

*To all whom it may concern:*

Be it known that I, EUGENE A. HOLDEN, a citizen of the United States, residing at Athol, in the county of Worcester and State of Massachusetts, have invented new and useful Improvements in Ticket-Holders, of which the following is a specification.

An object of the invention is to provide a receptacle for containing car tickets and the like, the said tickets being independently removable from the receptacle.

For the purpose mentioned, use is made of a casing having a cover hingedly mounted at one end thereof, the said casing having a longitudinally extending slot formed in the front side thereof and having a transversely extending slot formed in one end thereof and adjacent the front side, a flanged plate mounted to slide within the casing and having a slot formed in the ends thereof, a spring disposed in the casing and provided with lugs operable in the slots of the said plate and a handled ejector mounted to slide in the slot formed in the front side of the said casing, the slot in the end of the casing being adapted to receive therethrough the tickets ejecting from the said casing by the mentioned ejector.

Reference is to be had to the accompanying drawings constituting a part of this specification, in which similar characters of reference denote corresponding parts in all the views, and in which—

Figure 1:
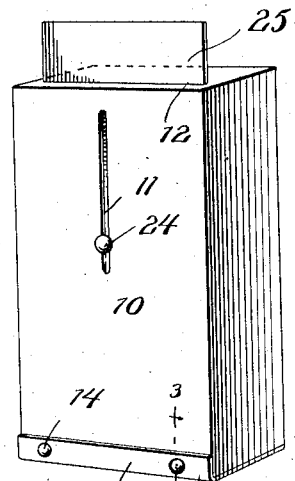
Figure 2:
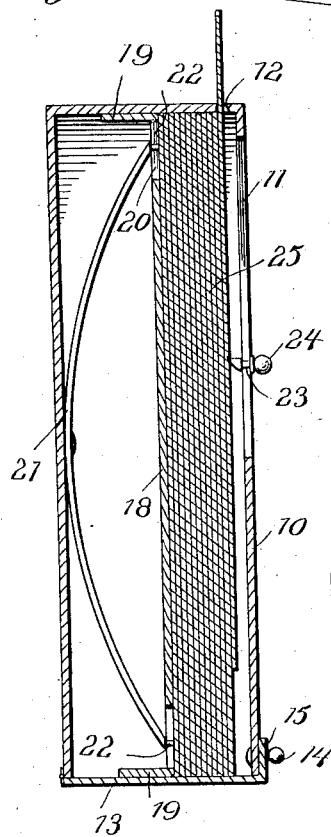
Figure 3:
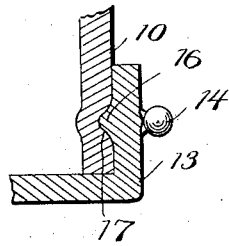
Figure 4:
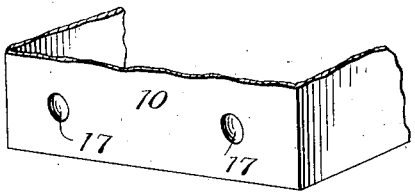

Figure 1 is a perspective view of my device showing a ticket partially removed therefrom. Fig. 2 is a vertical section. Fig. 3 is a fragmentary sectional view taken substantially on the line 3—3 in Fig. 1 looking in the direction of the arrow. Fig. 4 is a fragmentary perspective view of the lower front side of the casing, showing the manner of connecting one end of the cover to that portion of the casing.

Referring more particularly to the views I provide a casing 10 having a longitudinally extending slot 11 formed in the front side thereof and disposed centrally relatively to the front side and a transversely extending slot 12 is formed in the outer end of the casing and adjacent one end of the front side of the casing. Hingedly mounted on the rear side of the casing at the lower end thereof is a cover 13 having a handle 14 formed on an overlapping edge 15, the inner side of the said edge being provided with a plurality of beads 16 adapted to be received in indentations 17 formed at the lower end of the front side of the casing 10 as shown in Figs. 2 and 4. Mounted to extend longitudinally in the casing 10 is a plate 18 having laterally extending flanges 19 adapted for slidable engagement with the ends of the casing and the said plate is provided with longitudinally extending slots 20 formed in the plate adjacent the inner ends of the flanges 19. A curved leaf spring 21 is adapted to have a rear portion thereof abut against the rear of the casing 10 and the outer ends of the spring 21 are provided with integral guides 22 operable in the slots 20 of the plate 18 as shown in Fig. 2. Mounted to slide in the slot 11 on the casing 10 is an ejector 23 having its inner end pointed and projecting inside the casing, the outer end of the ejector being provided with an integral knob or handle 24.

In the use of my device the cover 13 is opened relatively to the casing 10 by disengaging the overlapping end 15 with the lower front side of the casing 10, thus removing the beads 16 from their position within the indentations 17 and a number of tickets 25 are disposed in the casing between the front side thereof and the plate 18, the number of tickets disposed in the casing depending entirely upon the size and capacity of the casing. It will be readily understood that when a large number of tickets are disposed in the casing, the plate 18 will be moved rearwardly in the casing by the pressure of the tickets and by the action of the spring 21 so that the tickets will be firmly pressed forwardly toward the front side of the casing. The cover 13 is then moved to closed position by swinging the cover so that the end 15 will overlap the lower front side of the casing and the beads 16 will be positioned in the indentations 17, thus releasably retaining the cover in closed position relatively to the casing. It will be readily seen that the first ticket in the casing, that is, the ticket immediately adjacent the inner front side of the casing will be in alinement with the slot 12 and by sliding the ejector 23 in the slot 11, the pointed end of the ejector will grip the first ticket and force the same outwardly through the slot 12. When the first ticket has been removed from the casing the remaining tickets will be pressed forwardly toward the front side of the casing by the action of the spring 21 against the plate 18 and by providing the slots 20 in the plate 18, the spring 21 will be slidable relatively to the plate and will at all times exert a force against the plate 18, thus tending to push or press the tickets toward the front side of the casing 10 so that the end ticket immediately adjacent the inner front side of the casing will at all times be in alinement with the slot 12. In this manner the various tickets contained in the casing can be successively ejected therefrom by operating the ejector 23 until all the tickets have been removed from the casing, when a new supply is placed in the casing by opening the cover 13 thereof as will be readily understood.

Having thus fully described the invention, what I claim as new, is—

In combination with a slotted casing having an ejector mounted thereon, a cover mounted to swing on the rear side of the casing, a flange formed on the cover and adapted to overlap the lower front side of the casing, a plurality of beads formed on the said flange and adapted to be received in indentations in the lower front side of the casing to retain the cover in closed position thereon, a plate mounted within the said casing, a plurality of integral flanges formed on the ends of the said plate and slidable relatively to the said casing, a leaf spring mounted to abut against the rear side of the casing and guide lugs formed on the ends of the said spring and operable in slots in the said plate to normally press the plate toward the front side of the casing so that the contents of the casing can be ejected therefrom.

In testimony whereof I affix my signature in presence of two witnesses.

EUGENE A. HOLDEN.

Witnesses:
GEORGE GRANT,
ANDRINA GRANT.

Copies of this patent may be obtained for five cents each, by addressing the "Commissioner of Patents, Washington, D. C."